United States Patent
Eriksen et al.

(10) Patent No.: US 8,740,566 B2
(45) Date of Patent: Jun. 3, 2014

(54) BRAKE SYSTEM FOR A WIND TURBINE WITH INTEGRATED ROTOR LOCK GENERATOR AND WIND TURBINE

(75) Inventors: Uffe Eriksen, Horsens (DK); Jens Anton Agerskov Veng, Ikast (DK)

(73) Assignee: Siemens Aktiengesellschaft, München (DE)

( * ) Notice: Subject to any disclaimer, the term of this patent is extended or adjusted under 35 U.S.C. 154(b) by 695 days.

(21) Appl. No.: 12/951,349

(22) Filed: Nov. 22, 2010

(65) Prior Publication Data

US 2011/0123339 A1    May 26, 2011

(30) Foreign Application Priority Data

Nov. 26, 2009 (EP) .................................. 09014765

(51) Int. Cl.
F03D 11/02    (2006.01)

(52) U.S. Cl.
USPC ..................... 416/169 R; 415/123

(58) Field of Classification Search
USPC .............. 415/18, 122.1, 123; 416/169 R, 32; 188/265, 17, 218 XL, 218 R
See application file for complete search history.

(56) References Cited

U.S. PATENT DOCUMENTS

| | | | |
|---|---|---|---|
| 4,460,838 A | 7/1984 | Ulicny | |
| 7,431,567 B1 | 10/2008 | Bevington et al. | |
| 7,467,530 B2 * | 12/2008 | Torrado et al. | 70/33 |
| 2004/0120820 A1 | 6/2004 | Dery et al. | |
| 2005/0230979 A1 | 10/2005 | Bywaters et al. | |
| 2007/0022791 A1 | 2/2007 | Torrado et al. | |
| 2007/0292260 A1 * | 12/2007 | Bagepalli et al. | 415/14 |
| 2009/0026771 A1 | 1/2009 | Bevington et al. | |
| 2009/0162202 A1 * | 6/2009 | Nies et al. | 416/147 |

FOREIGN PATENT DOCUMENTS

| | | |
|---|---|---|
| DE | 4402184 A1 | 8/1995 |
| EP | 1925820 A1 | 5/2008 |

OTHER PUBLICATIONS

Database WPI Week 200951, Thomson Scientific, London, 2009, pp. 1-2,—L83538, XP002598350.

* cited by examiner

Primary Examiner — Nathaniel Wiehe
Assistant Examiner — Aaron Jagoda

(57) ABSTRACT

A brake system for a wind turbine with integrated rotor lock, generator and wind turbine are disclosed. The brake system includes a rotor lock system which is integrated in the brake system. One embodiment includes an actuator such as a hydraulic cylinder. Another embodiment includes a rotor assembly with a brake disc.

17 Claims, 3 Drawing Sheets

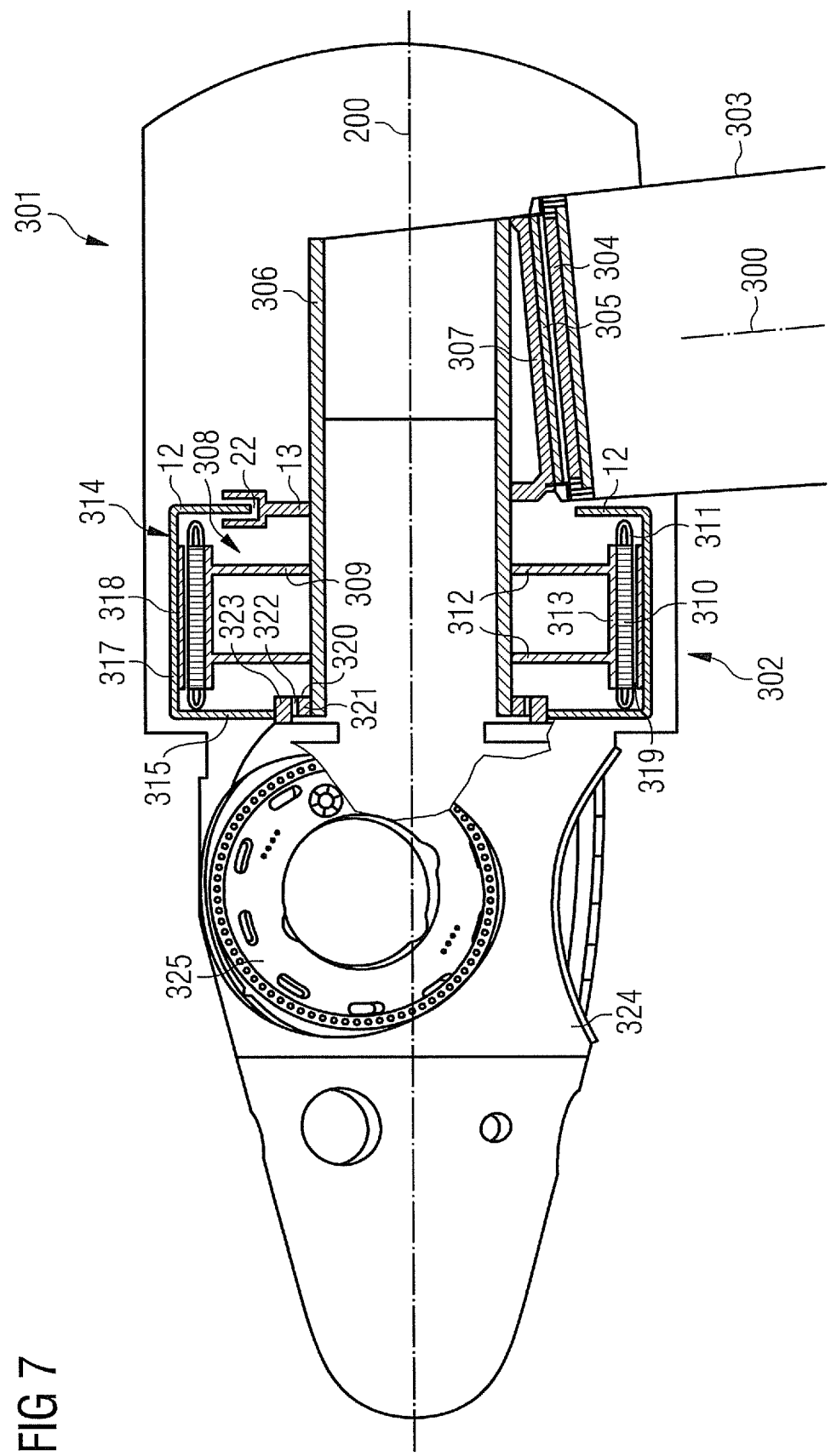

US 8,740,566 B2

BRAKE SYSTEM FOR A WIND TURBINE WITH INTEGRATED ROTOR LOCK GENERATOR AND WIND TURBINE

CROSS REFERENCE TO RELATED APPLICATIONS

This application claims priority of European Patent Office application No. 09014765.3 EP filed Nov. 26, 2009, which is incorporated by reference herein in its entirety.

FIELD OF INVENTION

The invention relates to a brake system for a wind turbine, especially for a generator, a generator and a wind turbine.

BACKGROUND OF INVENTION

In principle there are two main types of wind turbines in view of the direct drive configuration of a wind turbine. The first type of a wind turbine is the more classical type of a wind turbine comprising a gearbox arranged between a main shaft and a generator of the wind turbine. The second type of a wind turbine is a gearless type, where the gearbox and the conventional generator are substituted by a multipolar generator, a so called direct drive or directly driven generator. Such a direct drive generator can be made as a synchronous generator with winded rotor or with permanent magnets attached to the rotor, or it can be designed as an alternative type of a generator. One of the challenges with the direct drive generator is the mechanical brake system. The brake system needs to be located at the slowing rotating axis as no gear box is used. The brake system needs to withstand a large braking moment and large brake discs and callipers are necessary.

The US 2005/230979 describes a wind turbine which minimizes the size of the nacelle while providing adequate accessibility to components during maintenance operations. The wind turbine comprises: a nacelle and a blade rotor hub adjacent to said nacelle and a main shaft coupled to said hub and said nacelle. The generator is coupled to said shaft between said nacelle and said hub, wherein said generator includes generator rotor adjacent to said shaft, a stator positioned adjacent to and radially outward from said generator rotor; and a brake coupled to said generator and said shaft where the brake is positioned radially inward from said stator. The invention describes a solution that minimizes the brake system as the system can be more or less integrated into the generator. However, the proposed solution minimizes the size of the construction and also restricts the size of the brake system which is unwanted for a direct drive wind turbine where the size of the callipers and the brake disc should be as big as possible in order to withstand the high braking moments due to the slow rotational speed of the rotor. The brake system shown in US 2005/230979 also prevents passage though the generator and it is not possible to go into the hub from the nacelle/generator. Furthermore, the invention relates to a generator with an inner rotor configuration and it not possible to use the configuration for brake system with outer rotor configuration.

In US 2009/0026771 A1 a wind turbine comprising an electrical generator that includes a rotor assembly is disclosed. The wind turbine includes a frictional braking system for slowing, stopping or keeping stopped the rotation of the wind rotor and rotor assembly. In one implementation, the wind turbine/generator set includes a generator that includes a stator assembly and a rotor assembly rotatable about a rotational axis. The rotor assembly includes an active portion and an active portion support supporting the active portion. The wind turbine/generator set further includes a wind rotor coupled to the rotor assembly, a generator support fixedly supporting the stator assembly and rotatable supporting the rotor assembly. Furthermore, the wind turbine/generator set includes at least braking device fixed relative to the generator support. The braking device includes at least one frictional member operatively configured for frictionally engaging at least a portion of the active portion support. The rotor assembly is generally located radially inward of the stator assembly.

SUMMARY OF INVENTION

It is necessary to lock the rotor when ever a person needs to enter the hub. This is normally done by manually pushing a piston, a rod, a bolt or a similar means into a corresponding hole in the rotor.

It is a first objective of the present invention to provide an advantageous brake system for a wind turbine. It is a second objective of the present invention to provide an advantageous generator and it is a third objective of the present invention to provide an advantageous wind turbine.

The objectives are solved by a brake system for a wind turbine, a generator, and a wind turbine as claimed in the independent claims. The depending claims define further developments of the invention.

The inventive brake system for a wind turbine comprises a rotor lock system. The rotor lock system is integrated in a brake system. The inventive brake system may especially be used for a generator. A rotor lock system which is integrated in the brake system has the advantage, that it does not occupy extra space in a generator. For example, the rotor lock system may comprise at least one interlock, at least one snap-in lock, at least one block, at least one arrest, at least one barricade or at least one similar means.

Preferably the rotor lock system comprises an automatic actuator, for example for actuating the lock. The automatic actuator can, for example, be configured for locking at least a portion of a rotor assembly of a generator. Compared with manually locking a rotor, for example, by pushing a rod into a corresponding hole, an automatic actuator for actuating the lock has a number of advantages. First, it provides the possibility of locking the rotor from a distance which avoids the need for a person coming into contact with a possibly still rotating rotor. This providing increases the security of the system. Moreover, a number of locks, for example interlocks, can be actuated at the same time, which also increases the security of the system. In case of a wind turbine generator, the inventive brake system allows for locking the rotor before entering the nacelle and/or the hub.

The automatic actuator may advantageously comprise hydraulic or electrical means, for example a hydraulic cylinder.

The inventive brake system may comprise a stator assembly and a rotor assembly with a brake disc. The rotor lock system can be realised such that the brake disc comprises a number of recesses or holes, preferably in the inner surface of the brake disc, for example radially and/or symmetrically spaced. The stator assembly may comprise at least one piston or pin, preferably a number of pistons or pins. Preferably, the piston/pistons is/are located such that it/they are prepared to engage with the recess/recesses. For example, the pistons or the piston are/is prepared to engage with the corresponding recesses in the brake disc in order to lock the rotor in a parking position.

Preferably, the lock system may comprise an automatic actuator which advantageously is configured for pushing the pistons or the piston into the corresponding recesses or into the corresponding recess. The actuator may comprise hydraulic or electrical means, for example a hydraulic cylinder. In this case the pistons can be pushed into the corresponding recesses of the brake disc by hydraulic or electrical means. This way, it is possible to lock the rotor in an automated manner.

Moreover, the inventive brake system for a generator can comprise a rotor assembly, a stator assembly and a rotation axis. The rotor assembly may comprise an outer portion which is located radially outward of the stator assembly. The outer portion may comprise a brake disc. The stator assembly may comprise at least one frictional member. The frictional member can be operatively configured for frictionally engaging at least a portion of the brake disc.

The inventive brake system has the advantage, that the brake disc can be mounted on a cylindrical support structure of an outer rotor. In this case the possible large diameter of the machine can be fully used in order to use a brake disc with largest possible diameter. This increases the efficiency of the brake. Moreover, a bigger brake disc and bigger brake callipers can be used which provides a larger effective contact surface. A large effective contact surface is necessary in order to maintain the rotor in a parking position, for example. A further advantage is that more heat can be absorbed and distributed in a large brake disc compared with smaller brake discs.

Generally, the inventive brake system can be part of a direct drive generator or it can be connected to a direct drive generator. The generator may have an outer rotor configuration or an inner rotor configuration.

Advantageously the brake disc extends radially inward from the outer portion of the rotor assembly to the rotation axis. In this case the inventive brake system can be used for a direct drive generator. Furthermore, the inventive brake system may be part of a direct drive wind turbine with an outer rotor configuration or an inner rotor configuration.

Moreover, the rotor assembly may comprise a flange. The brake disc may be fastened to the flange. For example, the flange may comprise a number of holes, preferably bolt holes. The holes may be radially spaced. Preferably the brake disc is fastened to the flange by bolts or screws.

The brake system may be part of a wind turbine with a hub. In this case the brake system, especially the rotor assembly of the brake system, may comprise a near end which faces the hub and a far end which is located opposite to the hub. Preferably the flange, to which the brake disc is fastened, may be located at the fast end of the rotor assembly, which means opposite of the hub.

The inventive brake system may comprise a rotor support. In this case the brake disc may be fastened to a flange of the rotor support, for example by bolts or screws.

The stator assembly may comprise a stationary shaft. The at least one frictional member may be connected to the stationary shaft. The stator assembly may comprise a bed frame of a wind turbine. The at least one frictional member may be connected to the bed frame of the wind turbine. The stator assembly may comprise a stator support structure. The at least one frictional member may be connected to the stator support structure. For example, the at least one frictional member, for example at least one brake calliper, may be directly mounted to the stationary shaft or the bed frame of a wind turbine or a stator support structure.

Preferably the at least one frictional member may extend radially outward regarding the rotation axis. For example, the at least one frictional member may extend radially outward from the stator support structure or from the stationary shaft or from the bed frame of a wind turbine.

Especially, the frictional member may comprise at least one brake calliper. Preferably the frictional member comprises at least one brake calliper on each side of the brake disc, preferably in order to enclose the brake disc. Advantageously the at least one frictional member comprises at least one brake calliper system. The at least one calliper system may comprise at least to brake callipers located on each side of the brake disc opposite to each other. For example, the brake calliper system may comprise at least one calliper bracket. The calliper bracket may be used for mounting the callipers and/or the brake calliper system to another component of the brake system, for example for mounting to the stationary shaft. Each brake calliper system may be connected to a calliper bracket.

Advantageously the brake calliper system may be designed such that it is aligned to the brake disc in axial direction in such a way that no bending moment, especially no axial bending moment, is experienced at a fixation point of the brake calliper system. For example, the brake calliper system may be aligned to the brake disc in axial direction or it may be configured in such a way that no bending moment or substantially no bending moment is experienced at a fixation point of the brake calliper system to the calliper brackets.

Furthermore, the brake disc may comprise a number of radial segments. If the brake disc is divided into radial segments it is possible to exchange a large brake disc in an easy way.

The inventive generator comprises an inventive brake system as previously described. The inventive generator has the same advantages as the inventive brake system.

Generally, the generator may have an air gap, which is located between stator elements and rotor elements of the generator. The rotor elements contain permanent magnets for example, while the stator elements contain stacked laminate plates, which support at least one winding of the stator coil.

The air gap should be relatively small to ensure a high efficiency of the generator. Thus the air gap should stay in a range of only a few millimeters. For generators, like direct drive or directly driven generators, this is very difficult due to their size. Direct drive generators show a diameter of several meters.

Rotor elements and stator elements are typically arranged opposite to each other, thus the air gap has to ensure that they do not come into contact while the generator is at operation. Thus the air gap should be very small to ensure the efficiency of the generator on the one hand while a certain width of the air gap is needed to prevent mechanical damages.

Especially for a direct drive generator it is difficult to keep the air gap in a range of only a few millimeters. This requires therefore very rigid, massive and heavy support structures for the stator elements and for the rotor elements.

The air gap of a generator can be determined by tolerances of the permanent magnets, which are part of the rotor, by tolerances of the stacked laminate-plates, which are part of the stator, and/or by tolerances of the coil-windings, which are part of the stator-coil. Also other elements of the generator contribute to the dimensions of the air gap. The air gap may be designed in a way that the elements of the rotor and of the stator do not get in contact, while the rotor rotates around its dedicated rotational axis.

The inventive generator may comprise a rotor and a stator. Advantageously, the distance in radial direction (radial distance) between the brake disc and the frictional member is less than the distance in radial direction (radial distance) between the rotor and the stator. The frictional member can be the brake calliper or the brake calliper system or part of the brake calliper system, for instance a bracket. For example, the radial distance between the brake disc and the frictional member can be between 1 mm and 5 mm, preferably between 2 mm and 4 mm. The radial distance between the rotor and the stator can be between 4 mm and 10 mm, preferably between 5 mm and 7 mm.

If the radial distance between the brake disc and the frictional member is less than the radial distance between the rotor and the stator, the brake disc would hit the frictional member, for example the bracket of the brake calliper system, before the stator hits the rotor. This prevents damages to the generator and increases the safety of the system. The radial distance between rotor and stator is also called air gap. The generator may be part of a direct drive wind turbine with a unilateral bearing. The generator may comprises an unsupported end, which is the opposite end of where the bearing is located. By means of the inventive generator the air gap at the unsupported end can be maintained within the narrow tolerances.

The inventive wind turbine comprises an inventive brake system and/or an inventive generator as previously described. The inventive wind turbine has the same advantageous as the inventive brake system and/or an inventive generator. Preferably the inventive wind turbine may be a direct drive wind turbine. Moreover, the inventive wind turbine may comprise an outer rotor configuration or an inner rotor configuration.

The inventive wind turbine may comprise a nacelle, a hub and a generator. The generator may be located inside the nacelle or between the nacelle and the hub. The brake system may be connected to the generator and/or to the hub. For example, the brake system may be an integrated part of the generator and/or an integrated part of the hub.

The generator may comprises a near side facing the hub and a far side opposite to the hub. Preferably the brake system and/or the lock system may be located at the far side opposite to the hub.

Since the inventive brake system may be more or less an integrated part of the generator it does not take up extra space inside the nacelle. Moreover, entrance through the generator, especially through the stator, is possible, which is a great advantage. This provides easy access to the hub. Moreover, easy access to the parts of the brake system, especially if the brake system is located at the far side of the generator opposite to the hub, is provided. This allows for easier maintenance and service.

BRIEF DESCRIPTION OF THE DRAWINGS

Further features, properties and advantageous of the present invention will become clear from the following description of an embodiment in conjunction with the accompanying drawings. All features are advantageous alone or in combination with each other.

FIG. 7 schematically shows part of an inventive wind turbine.

DETAILED DESCRIPTION OF INVENTION

Figure 1:
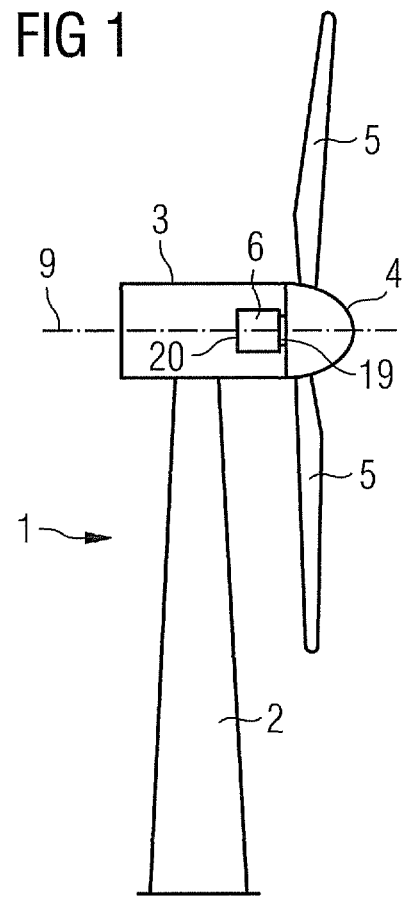
FIG. 1 schematically shows a wind turbine.

An embodiment of the present invention will now be described with reference to FIGS. 1 to 7. FIG. 1 schematically shows a wind turbine 1. The wind turbine 1 comprises a tower 2, a nacelle 3 and a hub 4. The nacelle 3 is located on top of the tower 2. The hub 4 comprises a number of wind turbine blades 5. The hub 4 is mounted to the nacelle 3. Moreover, the hub 4 is pivot-mounted such that it is able to rotate about a rotation axis 9. A generator 6 is located inside the nacelle 3. The wind turbine 1 is a direct drive wind turbine. The generator 6 comprises a near side 19 facing the hub 4 and a far side 20 opposite to the hub 4.

Figure 2:
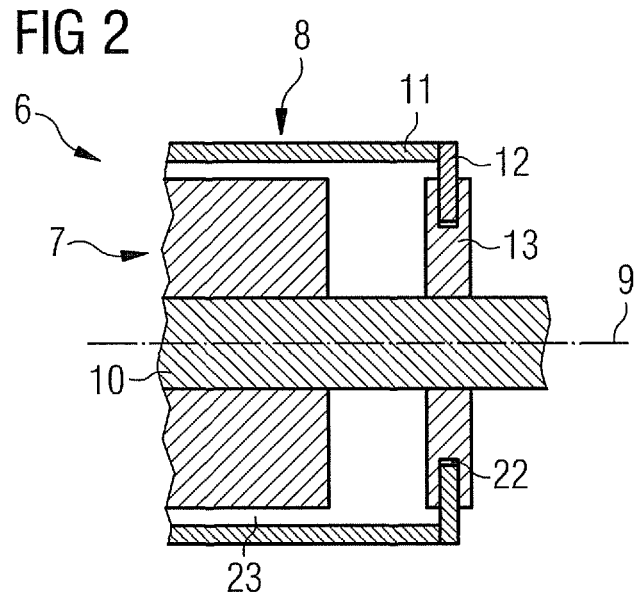
FIG. 2 schematically shows part of an inventive generator with an inventive brake system in a sectional view.

FIG. 2 schematically shows part of a generator 6 with an outer rotor configuration in a sectional view. The generator 6 comprises a stator assembly 7 and a rotor assembly 8. The stator assembly 7 comprises a stationary shaft 10 which is located close to the rotation axis 9. The rotor assembly 8 comprises an outer rotor portion 11 which is located radially outward of the stator assembly 7. The rotor assembly 8 further comprises a brake disc 12. The brake disc 12 may be part of the outer rotor portion 11 or it may be connected to the outer rotor portion 11. The brake disc 12 extends radially inward from the outer portion 11 to the rotation axis 9. The outer portion 11 of the rotor assembly 8 and the brake disc 12 are pivot-mounted about the rotation axis 9.

The stator assembly 7 further comprises a frictional member, in the present embodiment a brake calliper system 13. The brake calliper system 13 is operatively configured for frictionally engaging at least a portion of the brake disc 12. The brake calliper system 13 extends radially outward from the stationary shaft 10 to the brake disc 12. The brake calliper system 13 comprises at least one brake calliper on each side of the brake disc 12 in order to enclose the brake disc 12.

The radial distance 22 between the brake disc 12 and the brake calliper system 13 is less than the radial distance 23 (air gap) between the outer rotor portion 11 and the stator assembly 7. Advantageously, radial distance 22 is between 1 mm and 5 mm, preferably between 2 mm and 4 mm. Preferably, the air gap 23 has a width between 4 mm and 10 mm, advantageously between 5 mm and 7 mm.

Figure 3:
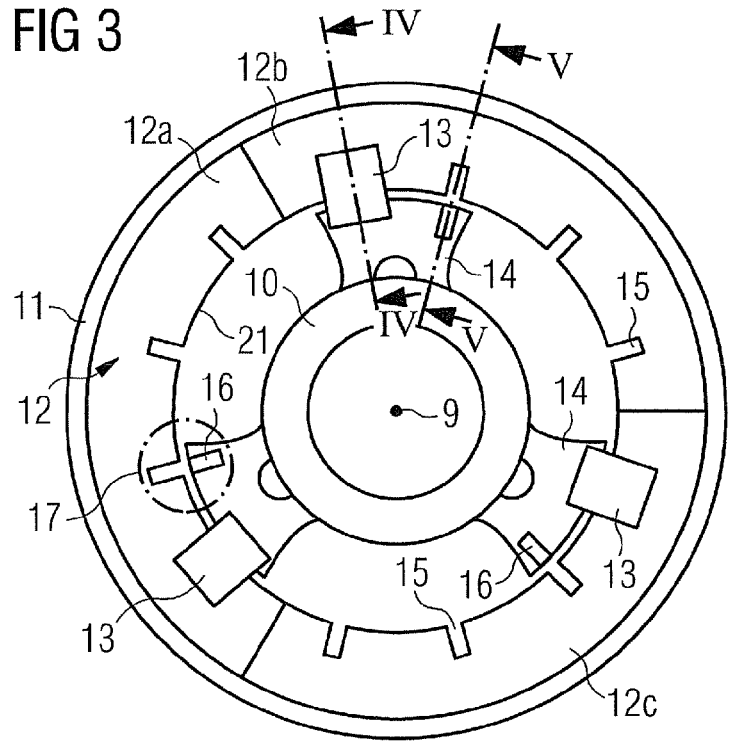
FIG. 3 schematically shows a front view of an inventive brake system.

FIG. 3 schematically shows a front view of the inventive brake system of the generator 6. Elements which correspond to elements of the previously described Figures are designated with the same reference numerals and will not be described again in detail. The brake disc 12 comprises an inner surface 21. The inner surface 21 of the brake disc 12 comprises a number of recesses 15. Preferably the recesses 15 are radially and/or symmetrically spaced in the inner surface 21.

Generally, the brake disc 12 can be divided into radial segments 12a, 12b and 12c. The brake disc 12 can also be divided into any other number of radial segments. This makes it possible to exchange a large brake disc 12 easily.

The brake system further comprises a number of central mounted flanges 14, in the present embodiment three central mounted flanges 14. The flanges 14 are mounted to the stationary shaft 10. The flanges 14 are staggered about an angle of 120° regarding the circumference of the stationary shaft 10. Alternatively any other number of the flanges 14 is possible. Preferably the flanges 14 are arranged around the circumference of the stationary shaft 10 such that adjacent flanges have an equal distance to each other.

The brake system comprises at least one rotor lock system 17. The rotor lock system 17 comprises at least one piston 16. The piston is located inside the flange 14 or is located inside of a lock casing. The lock casing can be connected to the flange 14. Alternatively, the brake system can comprise separate flanges for housing the pistons or for being connected with at least one lock casing of the rotor lock system 17 and separate flanges 14 being connected with the brake system, especially the brake calliper system 13.

The pistons 16 are located such that they are prepared to engage with the recesses 15 in the inner surface 21 of the brake disc 12. Preferably, the rotor lock system 17 comprises an automatic actuator. The automatic actuator may be configured for actuating the rotor lock. Especially, the rotor lock system 17 may comprise an automatic actuator for pushing the pistons 16 into the corresponding recesses 15. Preferably the actuator comprises hydraulic or electrical means, for instance a hydraulic cylinder. Instead of recesses also holes can be present in the brake disc 12 and instead of pistons also pins may be used.

Instead of the described rotor lock system 17 comprising a number of pistons 16 also a lock system comprising an interlock, a snap-in lock, a block, an arrest, a barricade or a similar means may be used.

Figure 4:
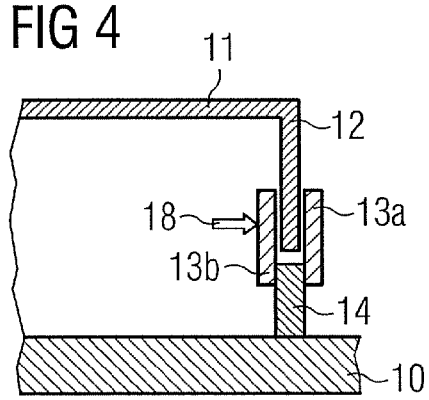
FIG. 4 schematically shows part of the inventive brake system in a sectional view along IV-IV of FIG. 3.

FIG. 4 schematically shows part of the inventive brake system in a sectional view along IV-IV of FIG. 3. In FIG. 4 two brake callipers 13A and 13B are located each on one side of the brake disc 12 opposite to each other. The two brake callipers 13A and 13B are connected to the central mounted flange 14. The flange 14 is connected to the stationary shaft 10. In FIG. 4 the brake disc is integrated part of the outer rotor portion 11. Alternatively, the brake disc 12 may be a separate element which is mounted to the outer rotor portion 11. For example, the brake disc 12 can be fastened to a flange of a rotor support, for instance by bolts or screws.

The actuation force for actuating the brake callipers 13A and 13B is designated by an error 18. When the brake callipers 13A and 13B are actuated, they frictionally engage a portion of the brake disc 12.

The wind turbine 1 may comprise a bed frame or a support structure of the stator. In this case the brake calliper system 13 can be mounted directly to the bed frame of the wind turbine 1 or to the support structure of the stator.

Figure 5:
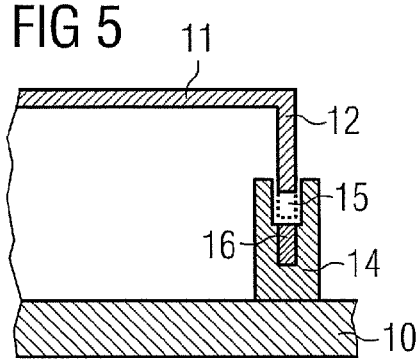
FIG. 5 schematically shows part of the rotor lock system of the inventive brake system in a sectional view along V-V.
Figure 6:
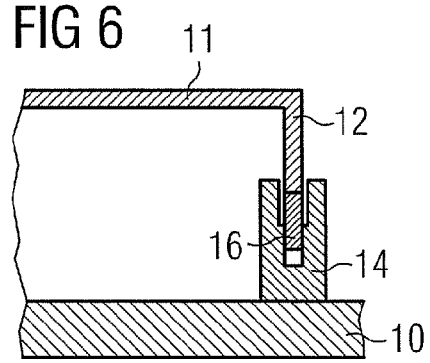
FIG. 6 schematically shows the rotor lock system of FIG. 5 in a locked position.

FIGS. 5 and 6 schematically show part of the inventive brake system in a sectional view along V-V of FIG. 3. In the present embodiment the rotor lock system 17 is integrated into the brake system. FIG. 5 schematically shows the rotor lock system in an unlocked state. FIG. 6 shows the rotor lock system in a locked state. In FIG. 5 the piston 16 is completely located inside of the flange 14 or inside of another component of the rotor lock system 17, for example a lock casing. In FIG. 6 the piston 16 is pushed into a corresponding recess 15 of the brake disc 12. In this position the rotor is locked in a parking position. The piston 16 can be pushed into the corresponding recess 15 of the brake disc 12 by hydraulic or electrical means.

Preferably the inventive brake system is located at the far side 20 of the generator 6 opposite to the hub 4. This allows for an easy access to the brake system and the integrated rotor lock system, especially for maintenance and service. Alternatively, the inventive brake system may be located at the hub. For example, the inventive brake system may directly be connected to the hub.

FIG. 7 schematically shows part of an inventive wind turbine 301. It comprises a typical and well known "one-bearing" arrangement. A wind turbine 301 comprises a direct drive generator 302, which is arranged on the upwind side of a tower 303 of the wind turbine 301.

A tower flange 304 is arranged on the top of the tower 303. A bedplate 305 is attached to the tower flange 304. The wind turbine 401 comprises a yaw system—not shown here—which is used to turn the bedplate 305 of the wind turbine 301 around the axis 300.

The wind turbine 301 comprises a stationary shaft 306, while the shaft 306 has a centre axis 200. The rear side of the stationary shaft 306 is attached to a retaining arrangement 307. On the front side of the stationary shaft 306 a stator arrangement 308 of the direct drive generator 302 is arranged. The stator arrangement 308 comprises a stator support structure 309 and a lamination stack 310. The lamination stack 310 supports windings 311.

The stator support structure 309 comprises two support elements 312 for a two side support of the lamination stack 310. The support elements 312 are ring-shaped. They are attached to the outside of the stationary shaft 306. A hollow cylindrical support element 313 is attached to the outer ends of the ring-shaped support elements 312. The hollow cylindrical support element 313 carries the ring-shaped lamination stack 310 and the windings 311.

A rotor arrangement 314 is arranged around the stator arrangement 308. The rotor arrangement 314 comprises a front endplate 315 and a cylinder element 317. The front endplate 315 is ring-shaped, while the cylinder element 317 is hollow.

The cylinder element 317 comprises a plurality of permanent magnets 318, which are mounted on the inside of the hollow cylinder element 317. The permanent magnets 318 are arranged opposite to the lamination stack 310 and the supported windings. An air gap 319 with a width of approximately 6 mm is located between the permanent magnets 318 and the lamination stack 310. Preferably, the air gap 319 has a width between 4 mm and 10 mm, advantageously between 5 mm and 7 mm. A brake disc 12 is connected to the cylinder element 317 of the rotor. A brake calliper system 13 is connected to the stationary shaft 306. The radial distance 22 between the brake calliper system 13 and the brake disc 12 is less than the air gap 319. Advantageously, radial distance 22 is between 1 mm and 5 mm, preferably between 2 mm and 4 mm.

The front endplate 315 is arranged on the stationary shaft 306 via a bearing 320. The bearing 320 is capable to transform axial loads in both directions of the centre axis A. An appropriate bearing is disclosed in DE 201 16 649 U1 for example.

The stationary part 321 of the bearing 320 is attached to the stationary shaft 306. The rotating part 322 of the bearing 320 is connected to a mounting ring 323. The front endplate 315 as well as the hub 324 are attached to the mounting ring 323. The hub 324 comprises mounting devices 325 for wind turbine rotor blades—not shown here.

The air gap 319 shown here is uniform to achieve a constant distance between the elements of the rotor and the elements of the stator. The one bearing design is very attractive due to its easy design.

The invention claimed is:

1. A brake system for a wind turbine, comprising:
   a rotor assembly comprising a brake disc with a radially inner surface;
   a stator assembly;
   a rotor lock system, which is integrated in the brake system, includes a plurality of recesses formed in a radially outward direction on the radially inner surface of the brake disk and includes a plurality of pistons comprised by the stator assembly, each of the plurality of pistons effective to engage in a radially inward direction with one of the plurality of recesses.

2. The brake system as claimed in claim 1, wherein the rotor lock system comprises an automatic actuator for actuating the lock.

3. The brake system as claimed in claim 2, wherein the automatic actuator comprises a hydraulic cylinder.

4. The brake system as claimed in claim 1, wherein the rotor lock system comprises an automatic actuator for pushing the piston into one of the plurality of recesses.

5. The brake system as claimed in claim 1,
the stator assembly comprises a frictional member operatively configured for frictionally engaging at least a portion of the brake disc;
the rotor assembly comprises an outer portion located radially outward of the stator assembly, the outer portion comprises the brake disc; and
a rotation axis.

6. The brake system as claimed in claim 5, wherein the brake disc extends radially inward from the outer portion of the rotor assembly to the rotation axis.

7. The brake system as claimed in claim 5, wherein the stator assembly comprises a stationary shaft, and wherein the frictional member is connected to the stationary shaft.

8. The brake system as claimed in claim 5, wherein the stator assembly comprises a bed frame of a wind turbine and wherein the frictional member is connected to the bed frame.

9. The brake system as claimed in claim 5, wherein the stator assembly comprises a stator support structure, and wherein the frictional member is connected to the stator support structure.

10. The brake system as claimed in claim 5, wherein the frictional member extends radially outward regarding the rotation axis.

11. The brake system as claimed in claim 5, wherein the frictional member comprises a brake calliper.

12. The brake system as claimed in claim 5, wherein the frictional member comprises a brake calliper system, which comprises a plurality of brake callipers located on each side of the brake disc opposite to each other.

13. The brake system as claimed in claim 1, further comprises:
a plurality of radial segments.

14. A generator for a wind turbine, comprising:
a brake system as claimed in claim 1.

15. The generator as claimed in claim 14, further comprises:
a rotor; and
a stator which comprises a frictional member operatively configured for frictionally engaging at least a portion of the brake disc,
wherein a radial distance between the brake disc and the frictional member is less than a radial distance between the rotor and the stator.

16. A wind turbine, comprising:
a brake system as claimed in claim 1.

17. The wind turbine as claimed in claim 16, further comprising:
a generator and/or a hub,
wherein the brake system is connected to the generator and/or to the hub.

* * * * *